United States Patent [19]

Suys et al.

[11] 4,224,524
[45] Sep. 23, 1980

[54] X-RAY IMAGE INTENSIFYING SCREENS COMPRISING RARE-EARTH OXYHALIDE PHOSPHOR PARTICLES

[75] Inventors: Andre R. Suys, Hove; Willy K. Van Landeghem, Sint-Gillis-Waas, both of Belgium

[73] Assignee: AGFA-GEVAERT N.V., Mortsel, Belgium

[21] Appl. No.: 970,999

[22] Filed: Dec. 19, 1978

[30] Foreign Application Priority Data

Jan. 16, 1978 [GB] United Kingdom ............... 1671/78

[51] Int. Cl.$^2$ .......................... C01T 1/20; C09K 11/46
[52] U.S. Cl. ................................... 250/486; 250/483; 252/301.36; 252/301.4 H
[58] Field of Search .................. 252/301.4 H, 301.36; 313/468; 250/483, 486

[56] References Cited

U.S. PATENT DOCUMENTS

| | | | |
|---|---|---|---|
| 2,716,082 | 8/1955 | Smith | 252/301.36 X |
| 3,999,993 | 12/1976 | Patel et al. | 313/468 X |
| 4,054,799 | 10/1977 | Wolfe et al. | 250/486 |
| 4,138,361 | 2/1979 | Suys et al. | 252/301.33 |

FOREIGN PATENT DOCUMENTS

2441784 3/1975 Fed. Rep. of Germany ........... 250/483

*Primary Examiner*—F. Edmundson
*Attorney, Agent, or Firm*—A. W. Breiner

[57] ABSTRACT

An X-ray image intensifying screen, which includes in a binder layer rare-earth oxyhalide phosphor particles that are in contact or admixed with an inorganic or organic substance or mixture of substances bringing about that the fluorescence power of said oxyhalide phosphor particles is less prone to be reduced by moisture, said substance being a non-phosphor substance or a phosphor substance other than calcium tungstate and producing hydroxyl ions when put in water, wherein the hydroxyl ion production power of said substance is such that when putting said substance in water at 25° C. in an amount of 0.1 equivalent per liter a pH of at least 8.0 is obtained and the solubility in water of said substance is such that at least 0.05 g of said substance is soluble in 100 ml of water at 20° C.

10 Claims, No Drawings

X-RAY IMAGE INTENSIFYING SCREENS COMPRISING RARE-EARTH OXYHALIDE PHOSPHOR PARTICLES

The present invention relates to improved X-ray image intensifying screens comprising rare-earth oxyhalide phosphor particles.

The commonly used X-ray intensifying screens comprise a support and a layer of fluorescent particles dispersed in a coherent film-forming macromolecular binder medium. Normally a protective coating is applied on top of the fluorescent layer to shield said layer from ambient influences e.g. moisture, air and mechanical abrasion.

The protection from moisture is required not only to prevent the fluorescent layer from staining but also to prevent water from contacting the phosphor particles since certain phosphors such as the rare-earth oxyhalide phosphors react with water and loose thereby their fluorescence power. Therefore, A. L. N. Stevels in Medicamundi 20, 13 (1975) considers the practical use of terbium-doped lanthanum oxybromide phosphor as not being realistic for reason of its hygroscopic character. Our own investigations proved that water reacts with lanthanum oxybromide according to the following reaction scheme:

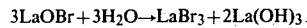

$$3LaOBr + 3H_2O \rightarrow LaBr_3 + 2La(OH)_3$$

In aqueous medium the lanthanum hydroxide has a very low solubility product.

According to the present invention an X-ray image intensifying screen is provided, which incorporates rare-earth oxyhalide phosphor particles, and wherein these phosphor particles are afforded a high protection against the influence of moisture and loss of fluorescence power.

The present invention includes also a process for preparing such screens.

The present X-ray image intensifying screen comprises in a binder layer rare-earth oxyhalide phosphor particles that are in contact or admixed with an inorganic or organic substance or mixture of substances bringing about that the fluorescence power of said oxyhalide phosphor particles is less prone to be reduced by moisture, said substance being a non-phosphor substance or a phosphor substance other than calcium tungstate and producing hydroxyl ions when put in water, wherein the hydroxyl ion production power of said substance is such that when putting said substance in water at 25° C. in an amount corresponding with 0.1 equivalent per liter (i.e. 0.1 N) a pH of at least 8.0 is obtained and the solubility in water of said substance is such that at least 0.05 g of said substance and preferably at least 0.1 g of said substance is soluble in 100 ml of water at 20° C.

In connection with the use of calcium tungstate in admixture with rare-earth oxyhalide phosphors the attention is drawn to the U.S. Pat. No. 4,054,798 by Minoru Watanabe, Ryoichi Kubo, Toshio Nishimura, Kazuto Yokota, issued Oct. 18, 1977.

The amount of said hydroxyl ion providing substance(s) in the screen of the present invention is such that water occasionally penetrating into said binder layer will obtain a pH above 7.0 at 25° C. Such can be checked by dissolving or swelling the binder(s) of the coating(s) of the screen and extracting the hydroxyl ion providing substance(s) with water by using 5 ml of water per g of the rare-earth oxyhalide phosphor and measuring the pH of the extract at 25° C. The measured pH value is preferably at least 8.

In a first embodiment the X-ray image intensifying screen according to the present invention comprises rare-earth oxyhalide phosphor particles in admixture with a hydroxyl ion producing metal hydroxide that is solid at 25° C. and produces in a 0.1 N aqueous solution a pH of at least 12 e.g. potassium hydroxide.

In a second embodiment the X-ray image intensifying screen according to the present invention comprises rare-earth oxyhalide phosphor particles in admixture with an inorganic or organic salt of a strong base and a weak acid, wherein said salt when put in water at 25° C. in 1 equivalent per liter is capable of yielding a pH of at least 8.0.

The strong base is a compound that produces hydroxyl ions in an amount corresponding with a pH of at least 12 when having that base in a 0.1 N aqueous solution at 25° C. The weak acid is an acid that in a concentration of 0.1 N in water has a dissociation constant (Ka) smaller than $10^{-3}$ at 25° C. Inorganic salts that are suited for use in the present invention are, e.g., alkali metal salts of weak inorganic acids. Examples of such salts are sodium fluoride, potassium fluoride, lithium fluoride, barium fluoride, sodium carbonate, sodium borate and sodium aluminate.

Examples of organic salts suited for use according to the present invention are alkali metal salts of weak organic acids, e.g. sodium acetate, sodium propionate, sodium succinate, sodium adipate, sodium benzoate and sodium cinnamate.

In a third embodiment the X-ray image intensifying screen according to the present invention comprises rare-earth oxyhalide particles in admixture with an organic base, e.g. an onium compound having the hydroxyl anion as counterion to the onium cation. Suited for producing such onium compound in water is an organic compound containing one or more amino groups that are optionally substituted and wherein said compound is solid at 25° C. and has a dissociation constant being sufficiently large to yield a pH of at least 8 when putting 0.1 equivalent of the organic base in 1 liter of water at 25° C. Examples thereof are piperazine having a melting point of 104° C. and a dissociation constant $(K_b)$ at 25° C. (step 1) of $6.4 \times 10^{-5}$, and betaine having a melting point of 293° C. and a $K_b$ at 20° C. of $1.45 \times 10^{-2}$.

According to a fourth embodiment the substance providing hydroxyl ions in aqueous medium is an alkaline reacting phosphor other than calcium tungstate. In this respect reference is made to alkali metal and alkaline earth metal borates and aluminates having fluorescence power. For example can be used in admixture with the rare-earth oxyhalide phosphor particles the europium(II) activated alkaline earth metal aluminates described by A. L. N. Stevels in Chemisch Weekblad, June 1976, p. m331–m332.

A preferred optional feature resides in the employment of a substance or mixture of substances which reduces the adverse effects of moisture on the halide containing phosphor and whose protective power satisfies a certain test. This test (hereafter called the "Standard Test") has been devised for the purpose of assessing the level of effectiveness of any selected substance for the protection of the rare-earth oxyhalide phosphor in accordance with the invention and is as follows:

STANDARD TEST

A. 10 g of terbium-activated lanthanum oxybromide phosphor (LaOBr:Tb$^{3+}$) with a terbium oxybromide content smaller than 0.5 mole % are put into 150 ml of water at 20° C. After being shaken for 1 min the solids are removed by centrifugation and a 10 ml sample of the separated solution is taken for titration according to Mohr. In the Mohr titration used for determining halide such as chloride and bromide a 1% by weight aqueous potassium chromate solution is used as indicator. From the indicator solution 1 ml is added to said 10 ml and the titration is carried out with 0.1 N aqueous silver nitrate solution. One drop (0.05 ml) of the silver nitrate solution has to produce already a faint but distinct change in colour indicating the end point of the titration. Therefrom has to be concluded that only a very small amount of bromide or no free bromide at all is present in the lanthanum oxybromide phosphor elected for the test. The obtained faint reddish-brown colour has to persist after brisk shaking (see "The Mohr titration" in "A Text-book of Quantitative Inorganic Analysis Including Elementary Instrumental Analysis" by A. I. Vogel 3rd ed.—Longmans (1961) p.259).

B. 10 g of the same phosphor as tested under A are put in 150 ml of water together with the substance to be tested on its stabilizing power, which substance is used in an amount of 0.015 equivalent (said amount of the substance involved has not necessarily to dissolve completely in the indicated volume of water). The obtained mixture is heated under reflux for 3 h and after cooling to 20° C. the solids are removed by centrifugation. From the clear liquid left 10 ml are taken and subjected to the described Mohr titration.

The alkaline reacting substance is regarded as being a substance affording that the fluorescence power of a rare-earth oxy halide phosphor is less reduced by moisture when in the titration no more than 1 ml and preferably no more than 0.25 ml of 0.1 N aqueous silver nitrate has to be used to reach said endpoint in the titration.

When in the test B the alkaline reacting substance is omitted, at least 25 ml of 0.1 N aqueous silver nitrate have to be used to reach the endpoint of the titration.

Preferably use is made as stabilizing substance of at least one hydroxyl ion providing substance, that is transparent to the light emitted by the rare-earth oxyhalide phosphor, e.g. blue light and ultraviolet radiation.

Lithium fluoride is preferred for its very high transparency to ultra-violet radiation.

The invention is particularly concerned with X-ray image intensifying screens containing rare-earth oxyhalide phosphor particles having as host metal lanthanum and/or gadolinium and one or more other rare-earth metals as activator metal.

The activator metal is preferably terbium or thulium. Optionally cerium, ytterbium, erbium and/or yttrium are used as activator metal preferably in combination with terbium.

Blue-light emitting phosphors suited for use according to the present invention are within the scope of the following general formula:

LnOX:Tb$^{3+}$(:Ce)

wherein:
Ln is one or more of lanthanum or gadolinium,
X is one or more of chlorine, bromine or iodine,
Tb$^{+3}$ being present in activator concentration up to about 30 mole % of the composition, e.g. between 0.01 to 0.6 mole %, and Ce being optionally present in the range of about 0.1 to 1.0 mole %.

The halogen X is preferably present in the range of between the stoichiometric amount and about 2.5 percent deviating thereof.

Preferred rare-earth oxyhalide phosphors include ytterbium as impurity and have the following general formula:

$$M_{1-w-y}OX:Tb_w^{3+}Yb_y$$

wherein:
M is an element selected from the group consisting of lanthanum and gadolinium,
X is an element selected from the group consisting of chlorine and bromine, and
w is from 0.0005 to 0.03 mole per mole of the selected oxyhalide, and
y is from 0.00005 to 0.005 mole per mole of the selected oxyhalide.

Phosphors according to the above formulae and their preparation are described in the United States Pat. No. 3,617,743 by Jacob G. Rabatin, Chardon Ohio, Robert A. Sieger, Greenfield, Wis., issued Nov. 2, 1971 and U.S. Pat. No. Re. 28,592 by Jacob G. Rabatin, Evelyn W. Bradshaw, issued Oct. 28, 1975.

Other particularly useful rare-earth oxyhalide phosphors contain lanthanum and/or gadolinium as host metal and thulium as activator metal. Such phosphors are described in the U.S. Pat. No. 3,795,814 by Jacob G. Rabatin, issued Mar. 5, 1974 and are stated to have a relative speed of more than 3 with respect to calcium tungstate.

In rare-earth metal oxyhalide phosphors a part of the halide may be fluoride e.g. as is present in a mixed crystal compound having the following general formula and whose preparation is described in the published German Patent Application No. 2,329,396 filed June 8, 1973 by Siemens A.G.:

LaOFX:Ce(:Y)

wherein:
X is halogen other than fluorine,
Ce being present in activator concentration, e.g. from $10^{-4}$ to $10^{-2}$ gram atom/mole of LaOFX, and
Y is at least one of the rare-earth elements terbium and erbium in an amount of 0 to $10^{-2}$ gram atom/mole of LaOFX.

Other suitable rare-earth oxyhalide phosphors contain gadolinium as host metal, and yttrium and cerium as activator metal. These phosphors are described in the published German Patent Application No. 2,540,344 filed Sept. 10, 1975 by Siemens AG and correspond to the following general formula:

GdOBr:Y(:Ce)

wherein:
Y is present in an amount of 0 to $10^{-1}$ gram atom/mole of GdOBr, and
Ce is present in an activating amount, preferably from $10^{-4}$ to $10^{-2}$ gram atom/mole of GdOBr.

These phosphors are less hygroscopic than the phosphors according to the first two general formulae mentioned above.

Terbium-activated lanthanum oxybromide phosphors modified for the elimination of afterglow may also be used. Such phosphors have been described in the published German Patent Application No. 2,461,260 filed Dec. 23, 1974 by Siemens A. G. and U.S. Pat. No. 4,054,798, already mentioned hereinbefore. In these phosphors part of the lanthanum is replaced by lead and/or thallium or by yttrium or lutetium.

The amount of hydroxyl-ion producing substance or mixture of such substances also called herein stabilizing substances suitable for a practically useful increase in stability against moisture of the applied rare-earth oxyhalide phosphor particles may be determined by simple tests.

The amount of said substance(s) in the screen is preferably such that on dissolving or swelling the binder(s) of the coatings of the screen with a solvent and extracting the substance(s) with 5 ml of water per g of the oxyhalide phosphor at 25° C. a pH of at least 8 is measured. Suitable amounts of said hydroxyl producing substance(s) e.g. for use in admixture with lanthanum oxybromide phosphors, are in the range of 0.05 g to 10 g per 100 g of phosphor.

When the oxyhalide phosphor contains in admixture water-soluble rare-earth halide, e.g. lanthanum(III) bromide, such may be first converted with the hydroxyl-producing substance into rare-earth hydroxide as is illustrated in the following reaction:

$$LaBr_3 + 3KOH \rightarrow 3KBr + La(OH)_3$$

Another feature of the X-ray image intensifying screen according to the present invention is that the rare-earth oxyhalide phosphor particles, which are in admixture with the above defined stabilizing substance(s) may be admixed with other fluorescent pigment particles, e.g. non-hygroscopic halide-free fluorescent pigment particles. These halide-free fluorescent pigment particles are preferably such that after having been stored for 64 h under conditions of 80% relative humidity and 25° C., they show a weight increase by uptake of water of at most 0.1%.

Halide-free phosphor particles that are particularly suited for use in admixture with rare-earth oxyhalide phosphor particles are e.g. $CaWO_4$, $Gd_2O_2S:Tb$, $La_2O_2S:Tb$ and $Y_2O_2S:Tb$. Calcium tungstate dissolves in water (20° C.) in an amount of 0.2 g per 100 ml and reacts therein by producing hydroxyl ions. One mole of calcium tungstate put in 1 liter of water produces a pH of more than 10.

According to a preferred embodiment the halide-free phosphor particles substantially emit in the spectral range wherein the rare-earth oxyhalide phosphor emits. E.g. blue-light emitting calcium tungstate phosphor particles are used in admixture with blue-light emitting rare-earth oxyhalide phosphor particles.

Suited X-ray image intensifying screens of the present invention contain in one screen layer in addition to the non-phosphor substance(s) that yield hydroxyl ions in aqueous medium calcium tungstate phosphor particles and rare-earth oxyhalide phosphor particles in a weight ratio range from 60:40 to 90:10. The phosphor binder layer containing rare-earth oxyhalide in admixture with said other phosphor particles has a rare-earth oxyhalide coverage preferably of between about 100 and about 250 g per sq.m. A preferred ratio by weight of rare-earth oxyhalide phosphor to calcium tungstate phosphor is 1:2, e.g. 150 g of rare-earth oxyhalide phosphor and 300 g of calcium tungstate per sq.m.

The particle size of the phosphors used in the screen of the present invention is preferably between 0.1 $\mu m$ and about 20 $\mu m$, more preferably between 1 $\mu m$ and 12 $\mu m$, this range embodying about 80% by volume of the phosphors present in said screen.

Suitable binders for use in the preparation of the phosphor layer are, e.g., a cellulose acetate butyrate, polyalkyl (meth)acrylates, e.g. polymethyl methacrylate and poly-n-butyl methacrylate, a polyvinyl-n-butyral e.g. as described in the U.S. Pat. No. 3,043,710 by Stanley Hancock Patten and Arnold R. Kunes issued July 3, 1973, a copoly(vinyl acetate/vinyl chloride) and a copoly(acrylonitrile/butadiene/styrene) or a copoly(vinyl chloride/vinyl acetate/vinyl alcohol) or mixture thereof.

To provide high X-ray efficiency it is preferred that a minimum amount of binder be employed in the phosphor layer. However, the less binding agent the more brittle the layer, so that a compromise has to be made.

The thickness of the supported phosphor layer is preferably in the range of 0.05 to 0.5 mm.

The coverage of phosphor is preferably in the range from about 300 to 750 g/sq.m.

For the preparation of the X-ray intensifying screen according to the present invention the rare-earth oxyhalide phosphor particles, the alkaline stabilizing substance(s) and optionally other phosphor particles, e.g. non-hygroscopic halide-free phosphor particles, are intimately dispersed in a solution of the binder and then coated upon a support. Alternatively, the rare-earth oxyhalide phosphor particles are first allowed to come in intimate contact with said stabilizing substance(s) in an organic liquid medium, e.g. a solution of the binder, to cause the stabilizing substance to adsorb or to react with the oxyhalide phosphor particles. This can be done by dispersing both ingredients in the organic liquid medium and thoroughly mixing in a ball mill. The mixture, if necessary after adjustment of the binder content, can then be coated on the support and dried.

It is also possible to contact the rare-earth oxyhalide phosphor particles with the alkaline stabilizing substance(s) before dispersing in the binder solution, e.g., dispersing the phosphor particles in a solution of the stabilizing substance(s) followed by removal of the solvent(s), e.g. by evaporation. The thus treated phosphor particles and optionally non-hygroscopic halide-free phosphor particles can then be dispersed together in a binder solution or they can be dispersed in separate binder solutions and the dispersions then mixed.

The dispersing of rare-earth oxyhalide phosphor particles in organic solvents such as ethylene glycol monomethyl ether or butanone proceeds very effectively with an acid dispersing agent such as GAFAC RM-710, GAFAC being a trade-name of GAF Corporation (see Chem. & Eng. News 40 (1962) No. 16 p. 87) (GAFAC RM-710 is a mixture of:

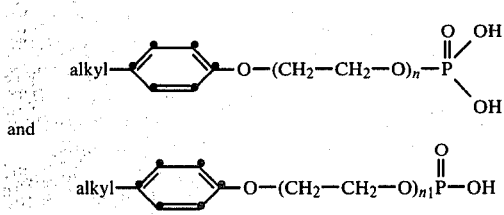

and

-continued

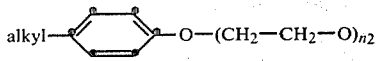

n=15 to 20
n₁+n₂=15 to 20
alkyl=C15 to C20).

According to a preferred embodiment, the dispersion is neutralized with an alkaline reacting compound, e.g. a strong inorganic base after the dispersing of the phosphor with the acid compound, and a surplus of hydroxyl providing compound is incorporated in the coating composition of the phosphor layer to obtain therein reserve alkalinity after coating and drying.

The coating of the present phosphor binder layer may proceed according to any usual technique, e.g. by spraying or dip-coating. After coating, the solvent(s) of the coating mixture is (are) removed by evaporation, e.g. by drying in an air current e.g. of 60° C.

An ultrasonic treatment can be applied to improve the packing density and to perform the de-aeration of the phosphor-binder combination. The phosphor-binder layer may be calendered to improve the packing density (i.e. the number of grams of phosphor per cm³ of dry coating) before the optional application of a protective coating.

Self-supporting screens of this invention can be prepared e.g. by means of "hot-pressing", excluding the use of solvent(s) in the manufacture of the screens.

In preparing an intensifying screen according to the invention the phosphor-binder composition may be coated on a wide variety of supports, e.g. cardboard and plastic film, e.g. polyethylene terephthalate film. The supports used in the fluorescent screens of the present invention may be coated with (a) subbing layer(s) for improving the adherence of the phosphor coating thereto.

Optionally, a light-reflecting layer is provided between the phosphor-containing layer and its support to enhance the exposure of the silver halide emulsion material. Such light-reflecting layer may contain white pigment particles dispersed in a binder, e.g. titanium dioxide particles, or may be made of a vapour-deposited metal layer, e.g. an aluminium layer having a high reflection power for ultraviolet radiation and blue light.

The image sharpness obtainable with a "fluorescent screen-silver halide material" system can be improved considerably by incorporating a fluorescent light-absorbing dye, called "screening dye", into the fluorescent screen material. As the oblique radiation covers a large path in the screen material, it is attenuated by the screening dye or dyes to a greater extent than the radiation impinging normally. The term "screening dye" used herein includes dyestuffs (i.e. coloured substances in molecularly divided form) as well as pigments.

Diffuse radiation reflecting from the support of the fluorescent screen material can be mainly attenuated in an anti-reflection layer containing the screening dyes subjacent to the fluorescent layer.

The screening dye does not have to be removed from the fluorescent screen material and may therefore be any dye or pigment absorbing in the emission spectrum of the fluorescent substance(s). Thus black substances such as carbon black particles of an average size of 0.15 to 0.60 μm incorporated in said anti-reflection layer or the phosphor layer yield quite satisfactory results.

To the phosphor-containing layer a protective coating may be applied preferably having a thickness in the range of 5 to 25 μm and comprising a film-forming polymeric material that is photographically inert towards a silver halide emulsion layer.

Polymeric materials suitable for that purpose include e.g. cellulose derivatves (e.g. cellulose nitrate, cellulose triacetate, cellulose acetate propionate, cellulose acetate butyrate), polyamides, polystyrene, polyvinyl acetate, polyvinyl chloride, silicone resins, poly(acrylic ester) and poly(methacrylic ester) resins, and fluorinated hydrocarbon resins, and mixtures of the foregoing materials. Representative examples of various individual members of these binder materials include the following resinous materials: poly(methyl methacrylate), poly(n-butyl methacrylate), poly(isobutyl methacrylate), copolymers of n-butyl methacrylate and isobutyl methacrylate, copolymers of vinylidene fluoride and hexafluoropropylene, copolymers of vinylidene fluoride and trifluorochloroethylene, copolymers of vinylidene fluoride and tetrafluoroethylene, terpolymers of vinylidene fluoride, hexafluoropropylene and tetrafluoroethylene, and poly(vinylidene fluoride).

According to a preferred embodiment, a protective layer comprising polyurethane is applied to the present X-ray image intensifying screen. Radiographic screens comprising as screen binder a polyurethane elastomer alone or in combination with an alkyl methacrylate polymer are described already in the U.S. Pat. No. 3,743,833 by Peter A. Martic and John Mc Cabe, issued July 3, 1973. The wording "polyurethane" is used here in the broadest sense defining a polymer being a reaction product of a polyisocyanate with an organic compound containing a plurality of hydroxyl groups. Said organic polyhydroxy compound is optionally a polymer e.g. a polymer containing vinyl alcohol units, a polyester containing free terminal hydroxyl groups or a polyester amide containing free hydroxyl groups.

Polyurethane resins found useful for forming a protective coating on a fluorescent screen layer of the present invention are described, e.g., in the United Kingdom Pat. No. 1,058,425, filed June 15, 1964 by Gevaert Photo-Producten N.V., which has to be read in conjunction herewith.

Preferably these polyurethane resins are formed of macromolecules that contain free hydroxyl groups and are cured with a polyisocyanate optionally at elevated temperature e.g. 70° C. and/or in the presence of a catalyst such as a tertiary amine or tin(IV) chloride mentioned in the study of J. W. Britain and P. G. Gemeinhardt, J. Appl. Polymer Sci., Vol. IV (1960) p.207-211. The curing reaction may be catalyzed after the application of the hydroxyl-containing polymers in admixture with the reactive polyisocyanates. Therefore, the catalyst may be introduced in the precoated dry layer in a liquid applied e.g. by kiss-coating.

According to a modified embodiment an amine is present in the fluorescent screen layer to provide therein an alkaline medium which amine penetrates therefrom into the protective polyurethane layer accelerating its curing.

According to a special embodiment the outer face of the screen intended for contact with the photographic silver halide emulsion material may contain a solid particulate material that has a static friction coefficient ($\mu$) at room temperature (20° C.) of less than 0.50 on steel as described in the published German Patent Application No. 2,616,093, filed Apr. 13, 1976 by Agfa-Gevaert A.G.

Antistatic substances can be applied to the screen to reduce the risk of electrical potential differences resulting in sparking. For example, the screens are treated with the "ANTI-STAT" 6 spray, which leaves an odourless transparent antistatic deposit. ANTI-STAT is a trade name of Braun Laboratories Div. Barrett Chemical Co. Inc., Philadelphia, Pa., U.S.A.

The fluorescent X-ray image intensifying screens of the present invention will normally be used in conjunction with light-sensitive silver halide materials emulsion-coated on one or both sides of the support.

In order to exclude local defects in the form of developable centres in the silver halide film used in conjunction with an X-ray image intensifying screen containing rare-earth oxyhalide phosphor particles including traces of radioactive elements, the screen may contain on top of the layer containing the rare-earth oxyhalide a light-diffusing layer or sheet, which contains numerous discrete light-scattering volumes of a substance or substances, e.g. calcium tungstate particles, distributed at random in a binder medium or partially embedded therein, such volumes having a mean size not larger than 20 μm, said layer or sheet being located so that fluorescent light of said phosphor particles can penetrate therethrough to the outside of said screen.

Such screen has been described in the published German Patent Application No. 2,709,664 filed Mar. 5, 1977 by Agfa-Gevaert A.G., which has to be read in conjunction herewith.

The following examples illustrate the present invention without, however, limiting it thereto. All parts, percentages and ratios are by weight unless otherwise stated.

EXAMPLE 1

2 g of poly(n-butyl methacrylate) dissolved in 31 ml of methyl ethyl ketone, 147 g of blue-light emitting terbium-activated lanthanum oxybromide phosphor and 0.75 g of GAFAC RM 710 (trade name) were ball-milled to a fineness of grind corresponding with 7 NS Hegmen Fineness-of-Grind measured with Hegman gauge as specified in ASTM D 1210. To the obtained dispersion 3 g of potassium hydroxide, 15.75 g of poly(n-butyl methacrylate) and sufficient methyl ethyl ketone to obtain a dispersion with a 72% solids content were added. The dispersion was stirred for 5 min, coated on a subbed polyethylene terephthalate support at a coverage of 420 g of the lanthanum oxybromide phosphor per sq.m and dried at 70° C. for 30 min.

The phosphor layer was overcoated with a protective coating from a 7.5% solution of cellulose acetate butyrate having a degree of substitution (DS) of acetyl 1.31 and a DS of butyryl of 1.51 in ethylene glycol monomethyl ether. The dried protective coating has a coating weight of 10 g per sq.m.

From the dried screen a piece of 5 cm×5 cm was cut and therefrom the phosphor layer was removed (washed off) with 50 ml of acetone. To the wash-off composition 5 ml of water were added for extraction of the hydroxyl producing compounds and the pH of the obtained mixture at 25° C. was measured. It was found to be 10.4.

EXAMPLE 2

Example 1 was repeated with the difference, however, that the described protective coating was replaced by a protective coating applied from the following composition: 6.3 g of poly(vinyl-n-butyral) still containing 12% of non-acetalized vinyl alcohol units and having an average molecular weight of 50,000, 3.7 g of 1,6-hexamethylene diisocyanate added as a 75% solution in ethylene glycol monoethyl ether acetate/xylene (1:1 by volume) and 31 ml of methyl ethyl ketone. Before dip-coating the composition was stirred for 5 min and applied so as to have a dry coating thickness of 7 μm. The coating was dried at 70° C. for 30 min.

EXAMPLES 3–6

Example 1 was repeated with the difference, however, that the potassium hydroxide was replaced by equivalent amounts of alkaline reacting sodium fluoride, barium fluoride, sodium acetate and piperazine respectively. On carrying out the extraction test as described in Example 1 the following pH values for the different screens in the order of the alkaline reacting compounds were found: pH 9.6, 7.2, 10.0 and 9.0 respectively.

EXAMPLE 7

2 g of poly(n-butyl methacrylate) dissolved in 22 ml of methyl ethyl ketone, 0.5 g of GAFAC RM 710 (trade name), 2 g of sodium fluoride, and 98 g of terbium-activated lanthanum oxybromide phosphor were ball-milled for 6 h. To the obtained dispersion were added whilst stirring 1 ml of 1 N potassium hydroxide in methanol, 10.5 g of poly(n-butyl methacrylate) and 30 ml of methyl ethyl ketone. The obtained dispersion was coated on a subbed polyethylene terephthalate support at a coverage of 400 g per sq.m of lanthanum oxybromide phosphor. The coated layer was dried at 70° C. for 30 min.

To this phosphor layer a second phosphor layer was applied from the following composition: 7.87 g of poly (vinyl-n-butyral) still containing 12% of non-acetalized vinyl alcohol units and having an average molecular weight of 50,000, 50 ml of ethyl acetate, 0.5 g of GAFAC RM 710 (trade name), 100 g of calcium tungstate phosphor particles, and 4.62 g of 1,6-hexamethylene diisocyanate added as a 75% solution in ethylene glycol monoethyl ether acetate/xylene (1:1 by volume). The composition was stirred for 4 min before coating and applied at a coverage of 175 g of calcium tungstate per sq.m.

This second coating was likewise dried at 70° C. for 30 min.

To this second phosphor layer a protective coating as described in Example 2 was applied and dried.

A 5 cm×5 cm area of the said three coatings was removed by wet-rubbing using 50 ml of acetone. To the stripped off composition 5 ml of water were added and the pH measured. It was found to be 10.5.

The hydroxyl ion providing substances used in the above Examples 1 to 7 satisfy the already mentioned Standard Test.

Although the present fluorescent screens are mainly intended for converting X-ray radiation into longer wave-length radiation such as ultra-violet radiation and visible light some of the rare earth metal oxyhalide phosphor screens more particularly those containing gadolinium as host metal and at least one other rare-earth metal as fluorescence activating metal have the property of fluorescing when struck by neutrons and are therefore suited for neutron detection and neutron-radiography. Screens suited for neutron-radiography are described e.g. in the U.S. Pat. No. 3,891,852 by Romain Henri Bollen and Robert Florent Van Esch issued June 24, 1975, and in the published German Patent Application (DT-OS) No. 25 40 344 filed Sept. 10, 1975 by Siemens A.G.

In order to exclude or counteract reproduction of structure, also called "artifacts", resulting e.g. from mounting the screens in the cassettes e.g. by means of adhesive tape it has proven to be advantageous to apply a light-absorbing or light-reflecting layer e.g. a metal layer such as a vapour-deposited aluminium layer to the rear-side of the support of the screen or between the support and the fluorescent layer. Good results have been obtained with such layer having an optical density of 2.5.

We claim:

1. An X-ray image intensifying screen, which includes in a binder layer rare-earth oxyhalide phosphor particles that are in contact or admixed with an inorganic or organic substance or mixture of substances bringing about that the fluorescence power of said oxyhalide phosphor particles is less prone to be reduced by moisture, said substance being a non-phosphor substance or a phosphor substance other than calcium tungstate and producing hydroxyl ions when put in water, wherein the hydroxyl ion production power of said substance is such that when putting said substance in water at 25° C. in an amount of 0.1 equivalent per liter a pH of at least 8.0 is obtained and the solubility in water of said substance is such that at least 0.05 g of said substance is soluble in 100 ml of water at 20° C.

2. A screen according to claim 1, wherein said substance is such that it satisfies the standard test defined herein.

3. A screen according to claim 1, wherein said substance is an inorganic hydroxyl ion producing metal hydroxide that is solid at 25° C. and produces in a 0.1 N concentration in water a pH of at least 12.

4. A screen according to claim 1, wherein the inorganic or organic substance is an inorganic or organic salt of a strong base and a weak acid, the strong base being a compound that produces hydroxyl ions in an amount corresponding with a pH at least 12 at 0.1 N in water at 25° C. and the weak acid being an acid that in 0.1 N concentration in water has a dissociation constant (Ka) smaller than $10^{-3}$ at 25° C.

5. A screen according to claim 1, wherein the said substance is an organic base containing one or more amino groups that are optionally substituted and wherein said compound is solid at 25° C.

6. A screen according to claim 4, wherein the salt is an alkali metal salt or an alkaline earth metal salt of an inorganic acid, or an alkali metal salt of an organic acid.

7. A screen according to claim 1, wherein in at least a part of the rare-earth oxyhalide compounds the host metal of the phosphor is a rare-earth metal and the activator consists of one or more other rare-earth metals.

8. A screen according to claim 7, wherein the rare-earth oxyhalide phosphor contains as host metal lanthanum and/or gadolinium and as activator metal terbium or thulium.

9. A screen according to claim 1, wherein said screen also contains calcium tungstate phosphor particles.

10. A screen according to claim 9, wherein the calcium tungstate phosphor particles and rare-earth oxyhalide phosphor particles are mixed in a weight ratio ranging from 60:40 to 90:10.

* * * * *